United States Patent
Poledna et al.

(10) Patent No.: US 10,146,735 B2
(45) Date of Patent: Dec. 4, 2018

(54) EXPANDED DISTRIBUTION UNIT

(71) Applicant: FTS Computertechnik GmbH, Vienna (AT)

(72) Inventors: Stefan Poledna, Klosterneuburg (AT); Hermann Kopetz, Baden (AT); Martin Schwarz, Wr. Neustadt (AT)

(73) Assignee: FTS COMPUTERTECHNIK GMBH, Vienna (AT)

( * ) Notice: Subject to any disclaimer, the term of this patent is extended or adjusted under 35 U.S.C. 154(b) by 273 days.

(21) Appl. No.: 15/019,234

(22) Filed: Feb. 9, 2016

(65) Prior Publication Data

US 2016/0232126 A1    Aug. 11, 2016

(30) Foreign Application Priority Data

Feb. 10, 2015   (AT) .................................. 50098/2015

(51) Int. Cl.
  G06F 15/173        (2006.01)
  H04L 29/08         (2006.01)
  (Continued)

(52) U.S. Cl.
  CPC .... *G06F 15/17331* (2013.01); *G06F 12/0835* (2013.01); *G06F 12/1081* (2013.01);
  (Continued)

(58) Field of Classification Search
  CPC ........... G06F 15/17331; G06F 12/1081; G06F 12/0835; H04L 49/35; H04L 49/106
  See application file for complete search history.

(56) References Cited

U.S. PATENT DOCUMENTS 4,970,721 A    11/1990  Aczel et al.
5,524,212 A *  6/1996  Somani ................. G06F 12/084
                                                          711/121
(Continued)

FOREIGN PATENT DOCUMENTS

EP          2209241 A2      7/2010
WO      WO-9966680 A1 *  12/1999  ............. H04L 47/10

OTHER PUBLICATIONS

First Office Action for Austrian Patent Application No. A 50098/2015 dated Jan. 21, 2016.
(Continued)

*Primary Examiner* — Ramy M Osman
(74) *Attorney, Agent, or Firm* — Eversheds Sutherland (US) LLP

(57) ABSTRACT

The invention relates to a method for processing real-time data in a distribution unit of a distributed computer system, the computer system comprising a plurality of node computers and distribution units, the distribution unit containing, in addition to a switching engine (SE) and a switching memory (SM), one or more application computers each with one or more application central processing units and each with one or more application memories (AM), wherein the switching engine of the distribution unit, when it receives, at one of its ports, a message intended for an application computer, forwards this message to the addressed application computer through a direct memory access (DMA) unit that is arranged between the switching memory and the application memory of the addressed application computer and that is under the control of the switching engine. The invention also relates to an expanded distribution unit and a computer system with such expanded distribution units.

11 Claims, 2 Drawing Sheets

(51) Int. Cl.
*G06F 12/1081* (2016.01)
*G06F 12/0831* (2016.01)
*H04L 12/931* (2013.01)
*H04L 12/933* (2013.01)

(52) U.S. Cl.
CPC ............ *H04L 49/103* (2013.01); *H04L 49/35* (2013.01); *H04L 67/10* (2013.01)

(56) References Cited

U.S. PATENT DOCUMENTS

| | | | |
|---|---|---|---|
| 5,909,564 A | 6/1999 | Alexander et al. | |
| 6,842,457 B1* | 1/2005 | Malalur | H04L 67/10 370/412 |
| 7,535,898 B2 | 5/2009 | Akella et al. | |
| 7,870,306 B2 | 1/2011 | Wilkinson | |
| 7,882,307 B1* | 2/2011 | Wentzlaff | G06F 12/0813 711/119 |
| 8,015,323 B2* | 9/2011 | Wunderlich | H04L 61/2038 700/16 |
| 8,612,637 B2* | 12/2013 | Chandhoke | G06F 15/17 710/8 |
| 2007/0140294 A1* | 6/2007 | Takatori | H04L 12/66 370/466 |
| 2010/0005294 A1* | 1/2010 | Kostiainen | H04B 10/1143 713/168 |
| 2013/0179528 A1* | 7/2013 | Gianisis | G06F 15/167 709/213 |
| 2014/0101347 A1* | 4/2014 | Chandhoke | G06F 13/404 710/26 |
| 2015/0304648 A1* | 10/2015 | Gulati | H04N 17/002 348/175 |
| 2016/0342545 A1* | 11/2016 | Arai | G06F 12/0868 |

OTHER PUBLICATIONS

SAE Standard von TT Ethernet. URL:http:// standards.sae.org/as6802.

Schoeberl M., "A Time-Triggered Network-on-Chip", Field Programmable Logic and Applications, 2007. FPL 2007. International Conference on; Aug. 1, 2007; pp. 377-382; XP031159098 gesamtes Dokument.

Kopetz H., Real-Time Systems, Design Principles for Distributed Embedded Applications. Springer Verlag. 2011, pp. 62-66.

Kumura Y., A Low-Power Link Speed Control Method on Distributed Real-Time Systems, 2013 IEEE 7th International Symposium on Embedded Multicore Scos, Sep. 26, 2013; p. 49-54, XP032525258.

\* cited by examiner

EXPANDED DISTRIBUTION UNIT

The invention relates to a method for processing real-time data in a distribution unit of a distributed computer system, the computer system comprising node computers and distribution units, the distribution unit containing, in addition to a switching engine (SE) and a switching memory (SM), one or more application computers, each of which having one or more application central processing units and one or more application memories (AM).

The invention also relates to a distribution unit for processing real-time data in a distributed computer system, the computer system comprising node computers and distribution units, the distribution unit containing, in addition to a switching engine (SE) and a switching memory (SM), one or more application computers, each of which having one or more application central processing units and application memories (AM).

Moreover, the invention relates to a distributed computer system comprising multiple node computers and distribution units.

In some technical applications, e.g., the computer-controlled driving of a vehicle, in which a number of diverse image sensors (e.g., camera, radar, laser) are used, large amounts of data must be transported and processed quickly in the distributed computer system controlling it, the distributed computer system consisting of a number of node computers and a communication system connecting the node computers. In many image sensors, a node computer associated with the sensor performs a first preprocessing of the data captured periodically. The preprocessing results are transferred from the sensor node computer through a distribution unit to a node computer which effects merging the diverse sensor data.

A distribution unit according to prior art consists of a number of ports for linking the incoming and outgoing data lines to the node computers sending and receiving the data, a central switching engine (SE) that distributes the incoming data, and a switching memory (SM) that buffers incoming data during the interval between the time of data input and the time of data output.

In a time-triggered communications system, in which the event of the beginning of the sending of a message is derived from the progress of the global time, all node computers and the distribution units have access to a global time of known accuracy. According to reference [4], p. 62, the known accuracy of the global time allows to derive the parameters for the building a sparse global time base. In a sparse global time base, a minimum interval is established between time-triggered events, so that it is possible to achieve a consistent temporal order of all time-triggered events in all node computers and distribution units of the distributed computer system, even despite the digitization errors of the digital time measurement and the clock synchronization errors that are always present.

In a time-triggered distribution unit, the SE stores a schedule which has been generated a priori, and which defines periodic time points of the sparse time base at which data are to be switched. The data coming from an input port is buffered in an area of the SM until it is output to the output port according to a specified schedule.

It is a goal of the invention to indicate a solution to improve the response-time behavior of a distributed computer system of above-mentioned type.

This is accomplished, in a method as described at the beginning, in that the switching engine of the distribution unit, when it receives, at one of its ports, a message intended for an application computer, forwards this message to the addressed application computer through a direct memory access (DMA) unit which is arranged between the switching memory and the application memory of the addressed application computer and which is under the control of the switching engine.

Likewise this goal is, in a distribution unit as described at the beginning and according to the invention, achieved by arranging DMA units between the switching memory of the distribution unit and the application memories (AM) of the application computers, and having control lines running from the switching engine of the distribution unit to each DMA unit, these control lines from the switching engine being able to transport commands to the DMA units, for DMA transfer of memory areas of the switching memory to memory areas of an application memory and for transfer of memory areas of the application memory to memory areas of a switching memory. The transfer of a memory or memory areas is to be understood as including, in particular, a transfer of data from this memory or these memory areas.

Finally, the goal of the invention is met, in a computer system mentioned at the beginning and according to the invention, by expanding one, or several or all, distribution units as described above.

Thus, according to the invention a distribution unit is expanded in such a way that it is possible to process data streams sent through the distribution unit directly in the expanded distribution unit.

This involves expanding the distribution unit as follows: The distribution unit is, in addition to the ports, provided with the SE and the SM, a number of application computers (AC), each consisting of one or more CPUs (application central processing units) and an associated application memory AM. Each AM and the SM have, arranged between them, a direct-memory access (DMA) unit that can be controlled by the SE. When a message arrives at an input port of the distribution unit and is to be sent to one of the AC, then the SE will control the corresponding DMA to induce direct data transport of the corresponding area of the SM to that of the AM.

If a message stored in a memory area of an AM is to be transferred to an output port of the distribution unit, then, e.g., a time-triggered SE will, at a time interval specified in a schedule, control the corresponding DMA to induce direct data transport of the specified area of the AM to the specified output port.

If a message stored in a memory area of an AM is supposed to be transferred to an output port of the distribution unit, then, e.g., in an event-driven system the SE is informed, over an additional control line from the application computer in question, where the message is to be picked up. The SE orders the corresponding DMA to induce the data transport from the specified area of the AM to the specified output port.

Advantageous embodiments of the method, the distribution unit, and the computer system, which can be implemented as alternatives or in any combination, are listed below:

In a time-triggered computer system, the switching engine and all application computers of the distribution unit have access to a global sparse time base, and the switching engine of the distribution unit outputs, at the global time points contained in a schedule created a priori, the command to start a DMA transfer of data from the switching memory to an application memory and to start a DMA transfer of data from an application memory to the switching memory, to a DMA unit arranged between the switching memory and an application computer or to each of the DMA units arranged between the switching memory and an application computer. Thus, a distribution unit has an integrated application computer and the DMA unit between the switching memory and the memory of the application computer is under the control of the switching engine, and the time points of the data transfer from the switching memory to the memory of the application computer and vice versa are derived from the progress of the global time;

the source and destination addresses of the data that the DMA is to transport between the switching memory and an application memory, or vice versa, are contained in a schedule of the switching engine;

in an event-controlled computer system, an application computer communicates over a control line of the switching engine that is present between the switching engine and an application computer, a memory area of the application memory from where an event-driven message is to be sent through the distribution unit, and then the switching engine commands the DMA unit arranged between the application computer and the switching memory to transport the specified data from the application memory to the switching memory; each application computer that is supposed to be able to transfer messages in an event-driven or time-triggered and event-driven manner will need such a control line from the switching engine;

during the transport intervals, that is, in particular, the intervals for the transport of messages from the switching memory (140) to the application computer (220), no CPU of the application computer accesses the area of its memory that is affected by transport;

in the distribution unit according to the invention, both time-triggered and event-driven messages are transported and processed; thus, preferably the distribution unit can work in both a time-triggered and also an event-driven manner. In case of a time conflict, it is preferable for time-triggered messages to be given preferential treatment, for example by delaying event-driven messages;

the data is transported according to the TTEthernet protocol;

an event-driven computer system has, between the switching engine and at least one application computer—preferably multiple application computers or especially preferably every application computer—a control line for exchanging commands between the switching engine and the at least one application computer or the multiple or all application computers, and a DMA unit, which is under the control of the switching engine, is arranged between the switching memory and each application memory;

at least one application computer, preferably all application computers, is/are realized as multiprocessor systems;

all subsystems of the distribution unit are implemented on a single highly integrated VLSI chip.

The invention will be explained in detail below using the drawings. The figures show as follows.

The following specific example serves to present one of the many possible implementations of the invention.

Figure 1:
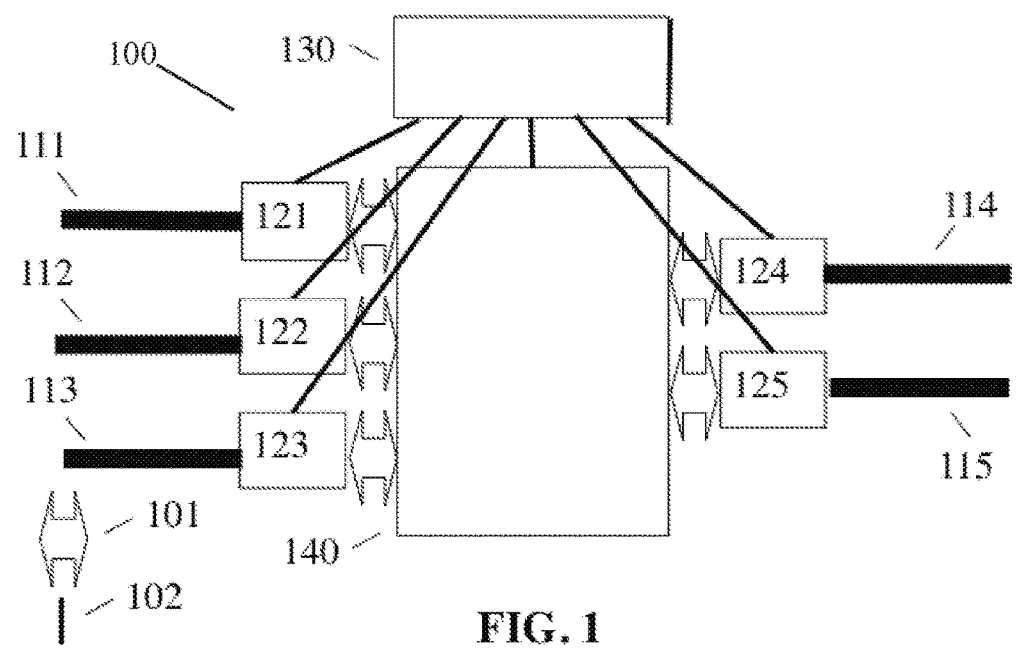
FIG. 1 shows a distribution unit according to prior art.
Figure 2:
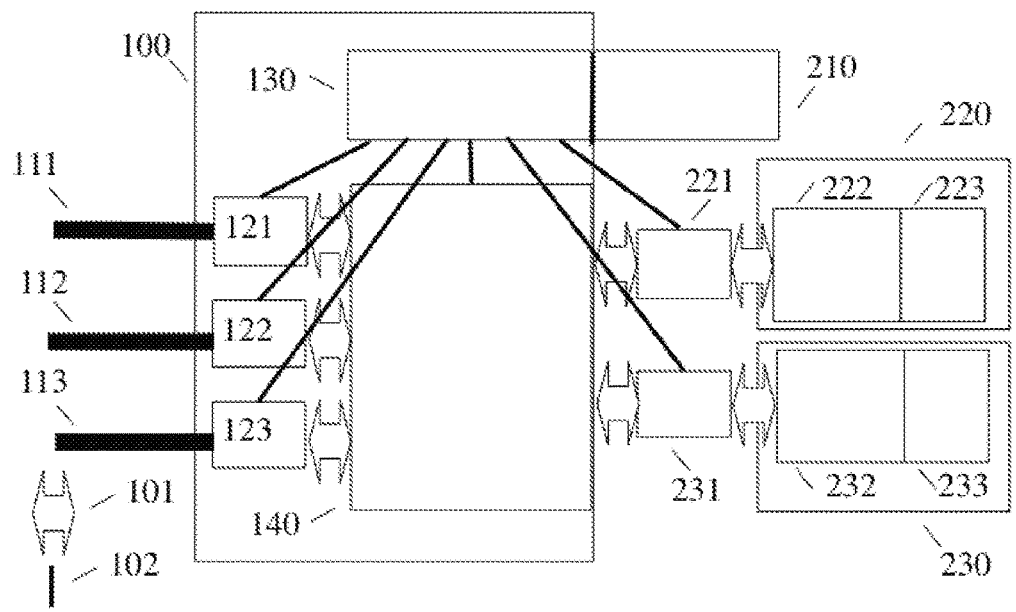
FIG. 2 shows an expanded time-triggered distribution unit with two application computers according to the invention.
Figure 3:
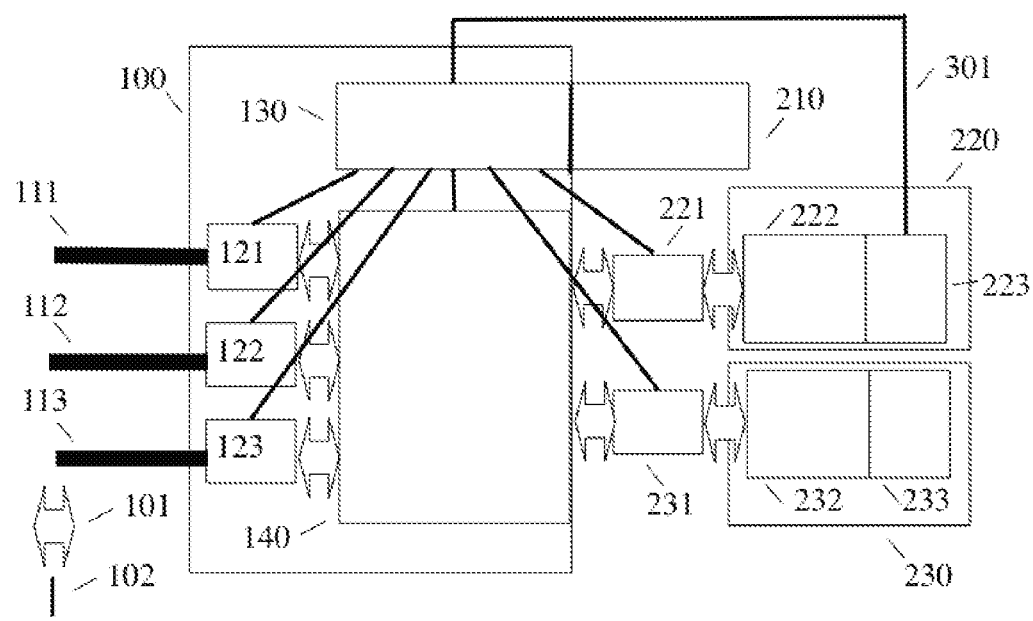
FIG. 3 shows an expanded event-driven distribution unit with two application computers according to the invention.

In FIGS. 1 to 3, reference number 101 represents the data lines between two connected units and reference number 102 represents the control lines for transferring control messages.

FIG. 1 shows the structure of a prior art distribution unit.

A prior art distribution unit 100 comprises a switching engine (SE) 130 that distributes the data to be switched, and a switching memory (SM) 140 in which the arriving messages are buffered between the reception time and the transmission time. FIG. 1 shows five bidirectional ports 121, 122, 123, 124, and 125, which form the end points of the corresponding data lines 111, 112, 113, 114, and 115 to the node computers of the distributed computer system.

A sequence of events of switching of a message from port 121 to port 125 according to prior art is described as follows. When a message arrives at port 121 over the line 111, then the port sends a control signal to SE 130. SE 130 decides in what area of the SM 140 the arriving message should be buffered. Then, SE 130 analyzes the header of the message that arrived, in order to determine to what output port the message should be switched; in the example it is port 125. In the case the port 125 is occupied at this time point, the message is put in a queue, allowing sending of the message as soon as this port 125 becomes free.

After that, there is a difference between the time-triggered and event-driven processes. A process is time-triggered if the control signals for performing an action are derived from the progress of a global sparse time base corresponding to a schedule created a priori. A process is event-driven if the control signals for performing an action are derived from the occurrence of an event, e.g., the arrival of a message.

In a time-triggered distribution unit, the prior art switching of the messages is based on a schedule defined beforehand. Such a schedule (block 210 in FIG. 2) contains the recurring time points at which a periodic message arrives at port 121. The schedule also establishes to what output port (in the example it is port 125) and at what time point of the global time the message should be switched and how long the port 125 will be occupied by the sending of this message. In addition, the schedule contains the source and destination addresses of the messages to be transported. Since the schedule 210 is created in such a way that no conflicts can occur, the message is switched without unforeseen delays.

According to the invention, the time-triggered distribution unit is now expanded as follows by the application computers 220 and 230, shown in FIG. 2. The application computer 220 contains the application memory AM 222 and the at least one CPU 223. The application computer 230 contains the application memory AM 232 and the at least one CPU 233.

The application computers may be multiprocessor systems, i.e., an application computer may have several CPUs.

The application memory AM 222 of the application computer 220 can exchange data with the switching memory SM 140 by means of a direct memory access (DMA) unit 221. In the same way, the application memory AM 232 of the application computer 230 can exchange data with the switching memory SM 140 by means of a direct memory access (DMA) unit 231.

The DMA unit 221 is under the control of the SE 130, i.e., the SE 130 of a time-triggered distribution unit decides, on the basis of a previously created schedule, during what time intervals a data flow should take place between the SM 140 and the AM 222 and in what memory area of the AM 222 a time-triggered message should be stored or from what memory area of the AM 222 to read a message that is to be sent. Thus, the previously created schedule of an inventively expanded distribution also contains, in addition to the time information, the source and destination addresses of the data to be transported through the DMA unit 221.

The DMA unit 231 is also under the control of the SE 130. The data is transferred between the SM 140 and the AM 232 through the DMA unit 231 as described in the previous paragraph.

Since a DMA unit supports a high degree of parallelism (e.g., 32-bit parallel), the time interval that is required for the transport of a message from SM 140 to the application computer 220—referred to as transport interval—is substantially shorter than the transport interval to transfer a comparable message from the SM 140 through the port 124 (FIG. 1) to a node computer of the distributed system, this node computer being connected through the data line 114. During the transport interval, no CPU of an application computer may access the data affected by the transport.

The significant shortening of the transport intervals of the data correspondingly improves the response time behavior of the distributed computer system.

Since in a time-triggered system the application computer 220 has access to the sparse global time base and knows the schedule 210 of the SE 130, the CPU 223 will not access any memory area of the AM 222 during the transport intervals when a data transfer is taking place between this memory area of the memory AM 222 and the memory SM 140, this data transfer having been induced by the SE 130. The same applies to the application computer 230. This limitation ensures the integrity of the transferred data.

An application computer, e.g., the application computer 220, can be a multiprocessor system that has multiple CPUs. During the transport intervals when a DMA 221 data transfer is taking place between the memory AM 222 and the SM 140, none of the multiple CPUs 230 of the application computer 220 may access a memory area of the AM 222 that is affected by the data transmission.

FIG. 3 shows an example in which the application computer 220 is enabled to transfer event-driven messages. Preferably, the application computer 220 can additionally also transfer time-triggered messages, as described above.

If, as shown in FIG. 3, event-driven messages are to be exchanged between the SM 140 and the AM 222 through the DMA unit 221, an additional control line 301 is provided between the SE 130 and the CPU 223 of the application computer 220.

The SE 130 of the CPU 223 of the application computer 220 can communicate, through this control line 301, that there is an event-driven message, having arrived in the SM 130, to be switched to the application computer 220. The CPU 223 then communicates to the SE 130 in what memory area of the AM 222 the arriving message should be written through the DMA unit 221, which is under the control of the SE 130, and refrains from accessing this memory area of the AM 222 during the transport interval, i.e., until the message transport has been completed.

If the CPU 223 is to send an event-driven message through the distribution unit, then the SE 130 is informed, over the control line 301, in what memory area of the AM 222 the message is. The SE 130 then induces the DMA unit 221 to transport the data from this memory area of the AM 222 to the SM 140.

In the example shown in FIG. 3, a control line 301 is provided only between the CPU 223 and the SE 130. However, the CPU 233 and the SE 130 can also have a control line (not shown) between them, so that the application computer 230 can also transfer event-driven messages.

According to the invention, the expanded distribution unit may send the messages according to the TTEthernet protocol [5]. The TTEthernet protocol allows the transport of time-triggered and event-driven messages. An expanded distribution unit based on TTEthernet can process both time-triggered and event-driven messages.

The progress of VLSI integration allows all subsystems of the expanded distribution unit, that is, the switching engine (SE), the ports, the switching memory (SM), the DMA units, and one or more application computers with their memories to be implemented on a single highly integrated VLSI chip. The high integration has substantial economic advantages in large-scale manufacture.

LITERATURE CITED

[1] U.S. Pat. No. 7,535,898
[2] U.S. Pat. No. 7,870,306
[3] U.S. Pat. No. 4,970,721
[4] Kopetz, H.: Real-Time Systems, Design Principles for Distributed Embedded Applications. Springer Verlag. 2011.
[5] The TTEthernet standard of the SAE. URL: http://standards.sae.org/as6802

We claim:

1. A method for processing real-time data in a distribution unit of a distributed computer system, the distributed computer system comprising node computers and the distribution unit, the distribution unit comprising a switching engine (130), a switching memory (140), and one or more application computers (220, 230) comprising one or more application central processing units (223, 233) and one or more application memories (222, 232), wherein the switching engine (130) of the distribution unit:
  receives, at one of its ports (121, 122, 123), a message intended for an application computer of the one or more application computers; and
  forwards the message to an addressed application computer (220, 230) of the one or more application computers through a direct memory access (DMA) unit (221, 231);
  wherein the DMA unit is arranged between the switching memory (140) and an application memory of the one or more application memories (222, 232) of the addressed application computer (220, 230) and is controlled by the switching engine (130),
  wherein the distributed computer system comprises a time-triggered computer system, in which the switching engine (130) and the one or more application computers have access to a global sparse time base, and the switching engine outputs, at global time points contained in a schedule created a priori, a command to the DMA unit arranged between the switching memory and the one or more application computers, the command instructing to start a DMA transfer of data from the switching memory to the one or more application memories and to start a DMA transfer of data from the one or more application memories to the switching memory.

2. The method of claim 1, wherein the source and destination addresses of the data that the DMA is to transport between the switching memory and the application memory, or vice versa, are contained in a schedule of the switching engine.

3. The method of claim 1, wherein during transport intervals, no CPU (223, 233) of the application computer (220, 230) accesses an area of its memory that is affected by the transport.

4. The method of claim 1, wherein both time-triggered and event-driven messages are transported and processed in the distribution unit.

5. The method of claim 1, wherein the data is transported according to the TTEthernet protocol.

6. A distribution unit for processing real-time data in a distributed computer system, the distributed computer system comprising node computers and distribution units, the distribution unit comprising:
- a switching engine (130);
- a switching memory (140);
- one or more application computers (220, 230), each of the one or more application computers having one or more application central processing units (223, 233) and one or more application memories (222, 232); and
- direct memory access (DMA) units (221, 231) arranged between the switching memory (140) of the distribution unit and the one or more application memories (222, 232) of the one or more application computers (220, 230), the DMA units having control lines running from the switching engine (130) of the distribution unit to each of the DMA units, the control lines enabling the transport of commands from the switching engine (130) to the DMA units (221, 231) for DMA transfer of memory areas of the switching memory (140) to memory areas of the one or more application memories and for transfer of the memory areas of the one or more application memories to memory areas of the switching memory (140), wherein the distributed computer system comprises a time-triggered computer system, in which the switching engine (130) and the one or more application computers have access to a global sparse time base, and the switching engine outputs, at global time points contained in a schedule created a priori, a command to the DMA unit arranged between the switching memory and the one or more application computers, the command instructing to start a DMA transfer of data from the switching memory to the one or more application memories and to start a DMA transfer of data from the one or more application memories to the switching memory.

7. The distribution unit of claim 6, wherein the control lines (301) are provided between the switching engine (130) and two or more, or all, of the one or more application computers (220).

8. The distribution unit of claim 6, wherein at least one application computer of the one or more application computers is realized as a multiprocessor system.

9. The distribution unit of claim 8, wherein all of the one or more application computers are realized as multiprocessor systems.

10. The distribution unit of claim 6, wherein all subsystems of the distribution unit are implemented on a single highly integrated VLSI chip.

11. A computer system comprising multiple node computers and distribution units, wherein the computer system comprises one or more distribution units of claim 6.

* * * * *